United States Patent [19]

Yamagishi

[11] Patent Number: 5,404,568
[45] Date of Patent: Apr. 4, 1995

[54] SATELLITE COMMUNICATION SYSTEM
[75] Inventor: Harumi Yamagishi, Tokyo, Japan
[73] Assignee: Sony Corporation, Japan
[21] Appl. No.: 217,760
[22] Filed: Mar. 25, 1994

Related U.S. Application Data

[63] Continuation of Ser. No. 708,723, May 31, 1991, abandoned.

[30] Foreign Application Priority Data

Jun. 13, 1990 [JP] Japan .................. 2-154713

[51] Int. Cl.⁶ ............................................. H04B 7/185
[52] U.S. Cl. ................... 455/12.1; 455/38.4; 455/54.1; 455/186.1
[58] Field of Search .......... 455/12.1, 18, 33.1, 455/54.1, 54.2, 154.1, 154.2, 158.1, 158.2, 186.1, 186.2, 38.2, 38.4; 340/311.1, 825.44, 158.4

[56] References Cited

U.S. PATENT DOCUMENTS

| Re. 32,365 | 3/1987 | Sebestyen | 340/311.1 |
| 4,897,642 | 1/1990 | DiLullo et al. | 455/99 |
| 4,910,510 | 3/1990 | Davis et al. | 340/825.47 |
| 4,979,170 | 12/1990 | Gilhousen et al. | 455/12.1 |
| 5,001,775 | 3/1991 | Hayashi et al. | 455/158 |
| 5,133,081 | 7/1992 | Mayo | 455/18 |

FOREIGN PATENT DOCUMENTS 9103885  8/1989  WIPO .................. 455/154

Primary Examiner—Reinhard J. Eisenzopf
Assistant Examiner—Chi Pham
Attorney, Agent, or Firm—Ronald P. Kananen

[57] ABSTRACT

A satellite communication system for transmitting a message between a mobile station and a stationary station through a communication satellite comprises a memory provided in a mobile station for previously storing a plurality of types of messages to be transmitted, and a unit provided in the stationary station for transmitting a command for modifying a message stored in the memory to the mobile station through the communication satellite to thereby modify the message stored in the memory.

7 Claims, 3 Drawing Sheets

FIG. 3

| 1. Departure Data and Time | 2. Expected Arrival Date and Time |
|---|---|
| 3. Current Time | 4. Trailer Exchange |
| 5. Road Conditions | 6. Cargo |

FIG. 4

Departure Date and Time

Date ( _ / )   Hour ( : )

Trailer Exchanged? Yes/No ( )

SATELLITE COMMUNICATION SYSTEM

This application is a continuation-in-part of application Ser. No. 07/708,723, filed May 31, 1991, now abandoned.

BACKGROUND OF THE INVENTION

1. Field of the Invention

The present invention relates to a satellite communication system and more particularly relates to a satellite communication system for transmitting a message between a mobile station such as an automobile or the like and a stationary station through a communication satellite.

2. Description of the Prior Art

There have previously been developed various types of communication systems wherein a message is transmitted between a cargo transport truck and a command center of a transport company through a communication satellite. As one of these communication systems, a communication system using a so called Geostar (company name) is known. The Geostar system performs a message communication in a manner as shown in FIG. 1 where a message is transmitted between a communication apparatus mounted on a truck 11 and a user center 14 which is a command center of a transport company through a geostationary satellite 12 and an operation center 13. In this case, the transmission of a message between the operation center 13 and the user center 14 is performed through a ground circuit such as a telephone network line or the like, and the message transmission between the operation center 13 and a truck 11 is performed through the geostationary satellite 12. The message repeated or relayed by the geostationary satellite 12 is transmitted with a frequency band of 1.6 GHz, for example. As messages are to be transmitted, a truck 11 transmits information such as departure time, expected arrival time and cargo etc., while the user center 14 transmits informations such as present or current time and road conditions etc.

In case of performing the message transmission as set forth above, a plurality of messages of fixed forms of sentences or standardized sentences to be transmitted are previously prepared and set at a truck 11 so that a crew member of a truck can easily operate the communication apparatus mounted thereon, whereby a crew member is merely required to input only numerals or characters such as time etc., in a part of the standardized sentence to thereby transmit the message of the standardized sentence where the numerals or characters are inserted.

For example, in case of transmitting information as to a departure time of the truck, a crew member selects a previously prepared standardized sentence of "departure time is __(hour) __(min.)" and inserts numerals indicating the departure time in blanks, whereby information of a code number of this standardized sentence and parts where the numerals representing the departure time is inserted is transmitted as a message to the operation center 13 through the satellite circuit and then transmitted therefrom to the user center 14 through the telephone network circuit 15.

This conventional message transmission using the standardized sentences, however, can only transmit standardized sentences previously prepared in the communication apparatus of the truck 11, and so when it is required to transmit another new message not prepared in the communication apparatus, this requirement could not be satisfied readily.

Namely, in this communication system for a truck, it is sometimes required by a transport company to modify the content of a message, but a standardized sentence is necessarily required to use a code number when transmitting it and so it was difficult for a crew member of a truck to set a standardized sentence and a code number thereof so as to modify the standardized sentence. Thus, the modification operation of a standardized sentence was performed by modifying a standardized sentence set in the communication apparatus mounted on a truck when a truck returned to a truck terminal. However, when a truck is a long distance touring one, a truck scarcely returns to the truck terminal, for example, once every several days or several weeks. Thus, if the modification operation of a standardized sentence set in the communication apparatus mounted on such a long distance touring truck is intended to be performed when the truck returns to the truck terminal, it takes a very long time to complete the modification operation of a standardized sentence of the communication apparatus of each of trucks, so that it is difficult to readily modify a standardized sentence when a requirement of modification of the standardized sentence is raised.

OBJECTS AND SUMMARY OF THE INVENTION

Accordingly, it is a general object of the present invention to provide an improved satellite communication system in which the aforementioned shortcomings and disadvantages of the prior art can be eliminated.

More specifically, it is an object of the present invention to provide an improved satellite communication system which is capable of readily modifying a message to be transmitted by easy operations.

According to an aspect of the present invention, a satellite communication system is comprised of a memory provided in a mobile station for previously storing plural types of messages to be transmitted, and a unit provided in the stationary station for transmitting a command for modifying a message stored in the memory to the mobile station through the communication satellite to thereby modify the message stored in the memory.

The above and other objects, features, and advantages of the present invention will become apparent from the following detailed description of illustrative embodiment thereof to be read in conjunction with the accompanying drawings, in which like reference numerals represent the same or similar objects.

BRIEF DESCRIPTION OF THE DRAWINGS

FIG. 3 is an explanatory diagram illustrating an example of display of messages displayed in a communication apparatus of the embodiment; and FIG. 4 is an explanatory diagram illustrating another example of display of a message displayed in the communication apparatus of the embodiment.

DETAILED DESCRIPTION OF THE PREFERRED EMBODIMENTS

The present invention will now be described with reference to the accompanying drawings.

Figure 1:
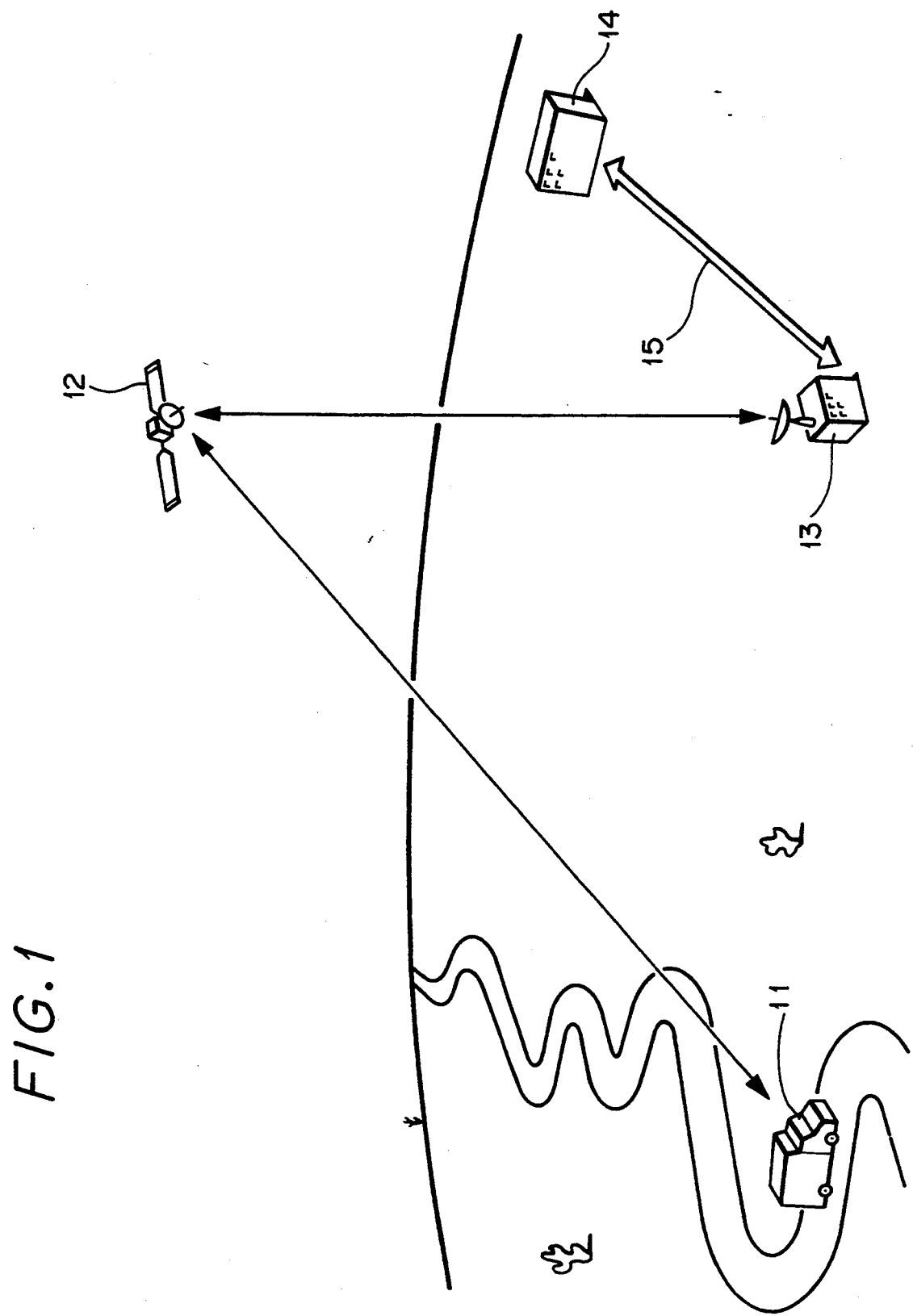
FIG. 1 is a diagram illustrating a satellite communication system to which a preferred embodiment of the present invention is applied.

A satellite communication system according to the preferred embodiment of the present invention is intended to transmit a message between a cargo transport truck and the command center of a transport company through a satellite circuit or line and more particularly to transmit fixed forms of sentences or standardized sentences by the Geostar system in the same manner as the communication system shown in FIG. 1.

Figure 2:
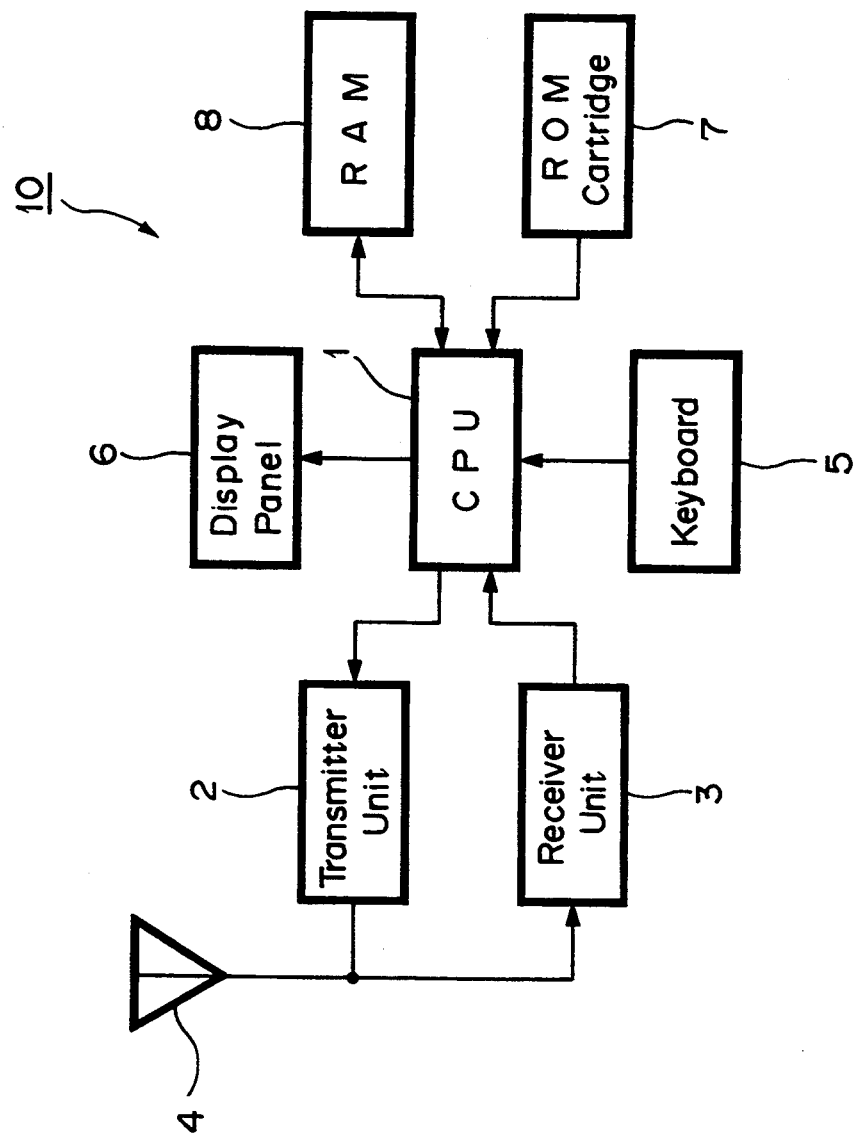
FIG. 2 is a block diagram illustrating an example of a communication apparatus applied to an embodiment of the present invention.

FIG. 2 is a block diagram illustrating a communication apparatus to be mounted on a truck in the preferred embodiment. In FIG. 2, a communication apparatus 10 totally mounted on a truck 11 includes a transmitter unit 2, a receiver unit 3, and a central processing unit (CPU) 1 constituted by a microcomputer which controls the transmission at the transmitter unit 2 and the reception at the receiver unit 3. In this communication apparatus, a transmitter-receiver antenna 4 is connected to the transmitter unit 2 and the receiver unit 3, and further both a keyboard 5 for performing such operations as input of transmission information or the like and a display panel 6 for performing such operations as display of received and transmitted information or the like are connected to the central processing unit 1.

In this embodiment, the communication apparatus preferably further includes a read only memory (ROM) cartridge 7 where message information of the standardized sentences capable of being received and transmitted by the communication apparatus 10 is stored and a random access memory (hereinafter abbreviated as a RAM) 8 for storing correction or modification information of the message information of the standardized sentences. In this embodiment, the ROM cartridge 7 where the message information of the standardized information is stored can be relatively easily exchanged by another one in such a manner that it can be exchanged when a truck mounting this communication apparatus 10 returns to a truck terminal, for example. The correction information of the message information of the standardized sentences stored in the RAM 8 is transmitted through the satellite circuit or line from the user center 14 to a truck through the geostationary satellite 12. The correction information thus transmitted is received by the receiver unit 3 through the antenna 4 and then stored in the RAM 8 under the control of the central processing unit 1.

When the correction information of the message information of the standardized sentences is stored in the RAM 8, the message information of the standardized sentences stored in the ROM cartridge 7 is corrected on the basis of the correction information under the control of the central processing unit 1 and then used in the transmission of the message of the standardized sentences as described later.

In case of transmitting the standardized sentences from the communication apparatus 10, at first the central processing unit 1 reads out the message information of the standardized sentences stored in the ROM cartridge 7 in response to the operation of the keyboard 5 by a crew member of the truck to thereby display the read standardized sentences on the display panel 6. In this case, at first a list of the standardized sentences stored in the cartridge 7 is displayed on the display panel 6 as shown in FIG. 3. Namely, the list of the sentences are displayed in such a manner that "1. departure date and time, 2. expected arrival date and time, 3. current time, 4. trailer exchange, 5. road conditions, and 6. cargo". Now, in this list, items of the current time and the road condition are provided for displaying information transmitted from the user center 14 of the command center of the transport company.

The crew member of the truck selects an item desired to be transmitted in a manner that at first the member selects an item desired to be transmitted by operating an up-down key of the keyboard 5 while viewing the list on the display panel 6 and then decides the selected item by pushing an enter key of the keyboard down.

When the item desired to be transmitted is thus decided, a standardized sentence of the selected item is displayed on the display panel 6. Namely, if the item of the departure date and time, for example, is selected, it is displayed that "date, time and whether or not the trailer has been exchanged ?" and a space is provided after each display as shown in FIG. 4. In this case, after the "date" and "time", spaces capable of inserting numerals representing departure date and departure time respectively are provided and further after the "whether or not the trailer has been exchanged ?", a space capable of inserting symbols "Y" or "N" representing Yes or No is provided.

Thus, a crew member of a truck inputs numerals and a symbol associated with the spaces by operating the keyboard 5.

After performing this input operation, if the crew member of the truck operates a transmission starting key on the key board 5, a code number of the standardized sentence where the input operation of the numerals and the symbol is performed, information of the inputted numerals and symbol and an individual number information of each of the trucks are transmitted from the transmitter unit 2 through the antenna 4 with a predetermined carrier wave under the control of the central processing unit 1. The transmission signal from the truck is received by the operation center 13 through the satellite circuit including the geostationary satellite 12 and the received transmission signal is transmitted to the user center 14 through the telephone network line 15.

The user center 14 discriminates the code number information, the information of the numerals and symbol and the individual number information of each truck included in the transmitted signal to store the discriminated information into a computer (not shown) for organizing trucks which are employed by the transport company, for example. Thus, in the user center, various organization of truck operations are performed by a terminal device connected to the computer such that operation conditions of trucks and so on are displayed on the basis of the transmitted information, if necessary.

On the contrary, the user center 14 transmits current time information at various regions and road condition information at various regions such as traffic regulation information, accident information, traffic snarl information and weather information etc. continuously or intermittently at an interval of a predetermined period through the satellite circuit using the geostationary satellite 12. The transmitted information from the user center 14 is received by the communication apparatus 10 of each of the trucks. In this case, as to the information which is transmitted at a high frequency, the standardized sentences thereof are previously stored in the ROM cartridge 7 of the communication apparatus 10 and so the user center 14 transmits only the code number information of the standardized sentences and data of changeable portion of the standardized sentences such as the data and time etc.

In each of the trucks, when a request for displaying these informations is raised in the communication apparatus 10, that is, when the crew member of the truck operates the key board 5 of the communication apparatus 10 so as to display current time and road conditions etc., the central processing unit displays the current time and the road conditions etc. on the display panel 6 on the basis of the received information.

In this embodiment, the message information of the standardized sentences thus transmitted can be corrected or modified by the correction or modification information transmitted from the user center 14 through the satellite circuit. Namely, when it is required by the user center 14 to obtain information other than that obtained for a crew member by responding to the standardized sentence stored in the ROM cartridge 7 of the communication apparatus 10 previously mounted on a truck, this user center 14 sends correction or modification information of the message information of the standardized sentence to respective trucks. This modification information of the message information of the standardized sentence sent from the user center 14 is transmitted to the communication apparatus 10 of each truck 11 from the operation center 13 through the satellite circuit including the geostationary satellite 12. The modification information of the message information of the standardized sentence includes, when a part of the standardized sentence stored in the ROM cartridge 7 is to be modified, for example, the code number information of this standardized sentence and information of the part to be modified, that is, information such as characters of the part of the standardized sentence to be modified.

Now, it is also possible by the modification information to instruct to the communication apparatus 10 to prepare new standardized sentence which is not stored in the ROM cartridge 7. In this case, the modification information includes information of the new standardized sentence, that is, information such as characters constituting the new standardized sentence, and a code number information of the new standardized sentence.

The communication apparatus 10 of each truck 11, in response to the reception of the modification information transmitted through the satellite circuit, stores the modification information into the RAM 8 under the control of the central processing unit 1.

Thus, once the modification information is stored in the RAM 8, if an operation for executing transmission or reception of information is performed by operating the key board 5 of the communication apparatus 10, a standardized sentence is displayed on the display panel 6 on the basis of the information stored in the ROM cartridge 7 and the modification information stored in the RAM 8. Namely, at first, the central processing unit 1 of the communication apparatus 10 reads out the stored information of the RAM 8 as well as the stored information of the ROM cartridge 7 to prepare a standardized sentence to be displayed, and in response to the operation for executing the transmission or reception of the information by the key board 5, the associated standardized sentence is displayed and transmitted from the transmitter unit 2 or information related to the associated standardized sentence received by the receiver unit 3 is displayed. Now, in this case, the transmission of the information of the standardized sentence is performed after inserting the information such as character(s) and/or numeral(s) in blank(s) of the standardized sentence displayed on the display unit.

As described above, according to the satellite communication system of this embodiment, the communication between the truck 11 and the user center 14 can be easily realized on the basis of the message information of the standardized sentences previously stored in the ROM cartridge 7 mounted in the communication apparatus 10, and further the standardized sentences to be transmitted can be easily modified at any time only in response to the instructions from the user center 14. Thus, the standardized sentences used for communication can be modified without returning a truck mounting the communication apparatus 10 thereon to the truck terminal and further the modification of the standardized sentences can be performed promptly upon the changes thereof caused on the business.

Now, if the ROM cartridge 7 itself is exchanged by one whose message information of the standardized sentence is modified when a truck 11 mounting the communication apparatus 10 thereon having the RAM 8 storing the modification information returns to the truck terminal, the communication using the modified standardized sentences can be performed only by using the information stored in the exchanged ROM cartridge 7 and so it is not necessary to provide a backup circuit for preventing the elimination of information stored in the RAM 8. Now, if a rewritable recording medium such as a floppy disc or the like is used instead of the ROM cartridge 7 and the RAM 8, the standardized sentences can be modified by directly writing the modification information into the recording medium, so that it is not necessary to exchange the recording medium.

The above-described embodiment shows a case where the present invention is applied to the satellite communication system using the Geostar system but the present invention is applicable to the communication systems using other satellite circuits. Further, the above-described embodiment shows the satellite communication system wherein a truck is used as a mobile station but the present invention is also applicable to a satellite communication system where an automobile, ship, airplane or the like is used an a mobile station mounting a communication apparatus thereon.

Thus, according to the present invention, a message transmittable from a mobile station can be arbitrarily set and modified in response to a command from the stationary station and so the setting and modification of message stored in the communication apparatus mounted on a mobile station positioned away from the stationary station can be performed remotely by the stationary station, so that, even when it is required to modify the transmittable message, the modification thereof can be performed immediately.

Having described the preferred embodiments of the invention with reference to the accompanying drawings, it is to be understood that the invention is not limited to those precise embodiment and that various changes and modifications thereof could be effected by one skilled in the art without departing from the spirit or scope of the invention as defined in the appended claims.

I claim as my invention:

1. A satellite communication system for transmitting a message between a mobile station and a stationary station through a communication satellite, comprising:

a ROM provided in said mobile station for storing a plurality of types of pre-recorded messages to be transmitted from said mobile station to said stationary station;

a RAM provided in said mobile station for receiving a command transmitted from said stationary station;

means provided in the stationary station for transmitting said command to said RAM in said mobile station for modifying one of said pre-recorded messages stored in said ROM, said command being transmitted to the mobile station through the communication satellite to thereby modify the one pre-recorded message stored in said ROM; and means provided in said mobile station for modifying the message stored in said ROM in accordance with the command stored in said RAM.

2. A satellite communication system according to claim 1, wherein said command transmitted from the stationary station includes information representing a code number of the message to be modified and information of a part to be modified of the message.

3. A satellite communication system according to claim 1, wherein said ROM means includes a memory which is exchangeable from another one.

4. A satellite communication system according to claim 3, wherein said ROM comprises a ROM (read only memory) cartridge.

5. A communication apparatus for use in a mobile vehicle, comprising:

a central controller;

input means, connected to said central controller, for receiving information from an operator;

a display panel, connected to said central controller, for displaying information to said operator;

an antenna;

a transmitter unit, connected to said antenna and to said central controller, for sending signals to said antenna from said central controller;

a receiver unit, connected to said antenna and to said central controller, for supplying signals received from said antenna to said central controller;

a ROM, connected to said central controller, for storing a plurality of pre-recorded standardized messages; and a RAM, connected to said central controller, for storing command signals transmitted from a stationary station remote from said vehicle;

wherein a command signal is transmitted by said stationary station in order to modify one of said plurality of pre-recorded messages, said central controller retrieves said one pre-recorded message along with its associated command signal when said one pre-recorded message is selected with said input means, and wherein said central controller displays said one pre-recorded message on said display panel after being modified by said command signal.

6. The communication apparatus as set forth in claim 5, wherein said central controller comprises a CPU and said input means comprises a keyboard.

7. The communication apparatus as set forth in claim 5, further comprising a ROM cartridge for replacing said ROM, said ROM cartridge incorporating said plurality of pre-recorded messages with said command signals.

* * * * *